Patented Mar. 16, 1943

2,313,875

UNITED STATES PATENT OFFICE 2,313,875

PROTEOLYTIC ENZYME PROCESS

Eugene F. Jansen, Takoma Park, Md., and Arnold K. Balls, Washington, D. C.; dedicated to the free use of the People of the territory of the United States No Drawing. Application December 17, 1940, Serial No. 370,500

7 Claims. (Cl. 195—66)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

This invention relates to the production of a new and useful product derived from the latex of the papaya. This product is a new proteolytic enzyme that we have named chymopapain. It is a protein digesting enzyme similar in properties to the now known papain, but differing from the latter in several ways. For instance, the ability of the new enzyme to clot milk is about twice as great as that of papain when both enzymes are compared on the basis of their ability to digest a protein, namely, hemoglobin. This is an advantage in all cases where the clotting action rather than the proteolytic action is desired. Another characteristic and advantageous property of our new enzyme is its resistance to relatively high concentrations of acid, comparable in fact to those existing in human gastric juice. This property is of importance when a proteolytic effect in the intestine is desired from material that must previously pass through the stomach.

Our preferred method of preparing chymopapain may be described as follows:

The undried latex of papaya is mixed with about three times its weight of hundredth normal hydrochloric acid. To this mixture is then added dilute hydrochloric acid (about normal) until a pH of substantially 2 has been attained. The acidified latex is next allowed to stand over night, or longer, in a cold place (0–10° C.). The material still in solution is then separated out, by any convenient means, such as filtration through paper. From the soluble portion, a small amount of inert protein is precipitated, by half saturation with sodium chloride at about 10° C. The desired enzyme is next precipitated as a nearly pure protein by raising the concentration of salt to full saturation, while the pH is kept at a level of substantially 2, by the addition of normal alkali, if necessary. The precipitate of protein is removed by any suitable means, and may be kept as a thick paste out of contact with the air, and in the cold. The keeping properties at higher temperatures are enhanced by addition of enough alkali to the protein to bring its pH to 4.5–6.0.

This protein may be further purified, if desired, and eventually may be crystallized, by redissolving the paste in saturated sodium chloride solution by adjusting the pH to 4.5–6.0, and reprecipitating the enzyme protein by the gradual addition of acid in the cold, until a pH of approximately 2.0 is obtained; or, the purification may be accomplished by dissolving the protein in acid at a pH of 2, and then precipitating the enzyme, by increasing the concentration of salt.

When the activity and other properties of the several times recrystallized new enzyme protein are compared with those of the uncrystallized precipitates obtained in the first stages of this process, it is found that even in the first stages, the enzyme is present in sufficiently pure form for most purposes.

Having thus described our invention, what we claim for Letters Patent is:

1. The process comprising acidifying undried latex of papaya to a pH of about 2, separating the liquid phase, precipitating inert protein from the liquid phase, removing the inert protein and saturating the liquid with sodium chloride, the while maintaining a pH of about 2, to precipitate chymopapain, followed by separation and recovery of the precipitated chymopapain from the mother liquor.

2. The process comprising acidifying undried latex of papaya to a pH of about 2, aging the acidified latex, separating the liquid phase, precipitating inert protein from the liquid phase, removing the inert protein and saturating the liquid with sodium chloride, the while maintaining a pH of about 2, to precipitate chymopapain, followed by separation and recovery of the precipitated chymopapain from the mother liquor.

3. The process comprising acidifying undried latex of papaya to a pH of about 2, aging the acidified latex at a temperature of about 0° to 10° C., separating the liquid phase, precipitating inert protein from the liquid phase, removing the inert protein and saturating the liquid with sodium chloride, the while maintaining a pH of about 2, to precipitate chymopapain, followed by separation and recovery of the precipitated chymopapain from the mother liquor.

4. The process comprising acidifying undried latex of papaya to a pH of about 2, separating the liquid phase, partially saturating said liquid phase with sodium chloride to precipitate inert proteins therefrom, removing the inert protein and increasing to saturation the concentration of sodium chloride in the liquid, the while maintaining a pH of about 2 to precipitate chymopapain, followed by separation and recovery of the precipitated chymopapain from the mother liquor.

5. The process comprising acidifying undried latex of papaya to a pH of about 2, separating the liquid phase, partially saturating at a temperature of about 10° C. said liquid phase with sodium chloride to precipitate inert proteins therefrom, removing the inert protein and increasing to saturation the concentration of sodium chloride in the liquid, the while maintaining a pH of about 2 to precipitate chymopapain, followed by separation and recovery of the precipitated chymopapain from the mother liquor.

6. The process comprising acidifying with hydrochloric acid undried latex of papaya to a pH of about 2, separating the liquid phase, precipitating inert protein from the liquid phase, removing the inert protein and saturating the liquid phase with sodium chloride, the while maintaining a pH of about 2, to precipitate chymopapain, followed by separation and recovery of the precipitated chymopapain from the mother liquor.

7. The process comprising acidifying with hydrochloric acid undried latex of papaya to a pH of about 2, aging the acidified latex at a temperature of about 0° to 10° C., separating the liquid phase, partially saturating the liquid phase with sodium chloride to precipitate inert proteins therefrom, the while maintaining a temperature of about 10° C., removing the inert protein and increasing the concentration of sodium chloride in said liquid to saturation, the while maintaining a pH of about 2, to precipitate chymopapain, followed by separation and recovery of the precipitated chymopapain from the mother liquor.

EUGENE F. JANSEN.
ARNOLD K. BALLS.